Sept. 4, 1962 R. K. SWANSON 3,052,319
CANTILEVER SHOPPING CART AND COUNTER ASSEMBLY
Filed May 4, 1959 2 Sheets-Sheet 1
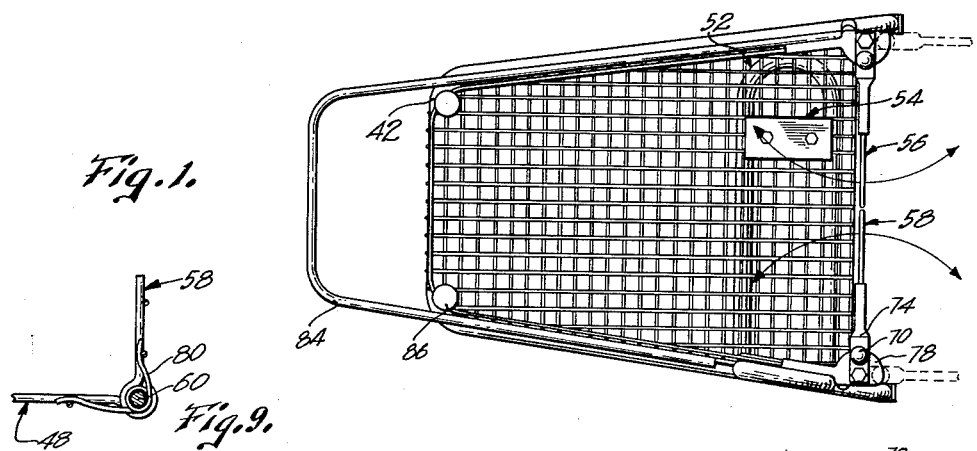
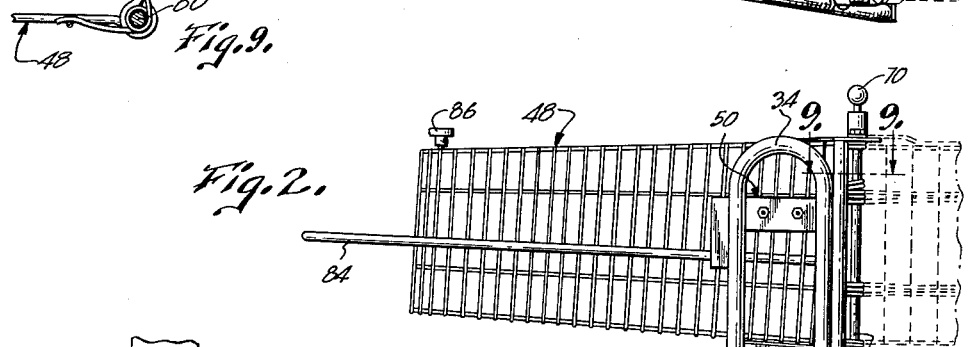
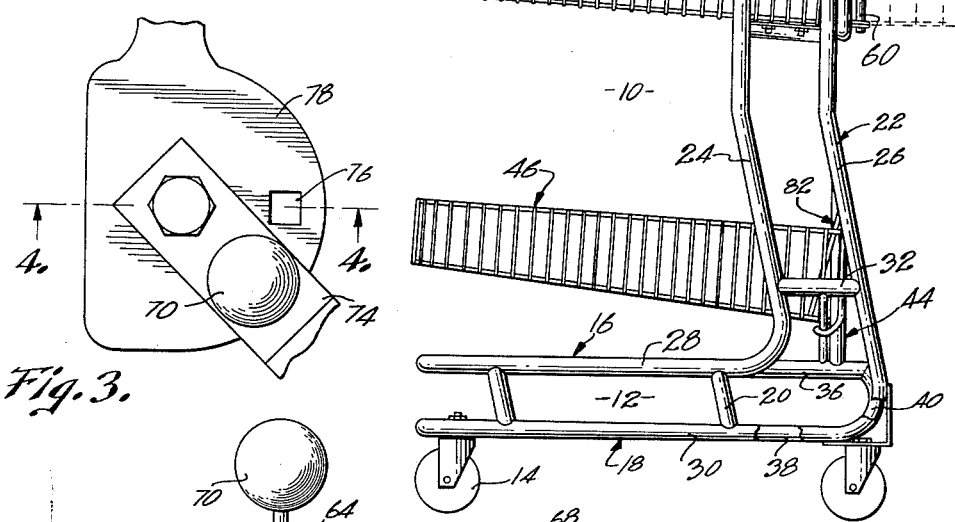
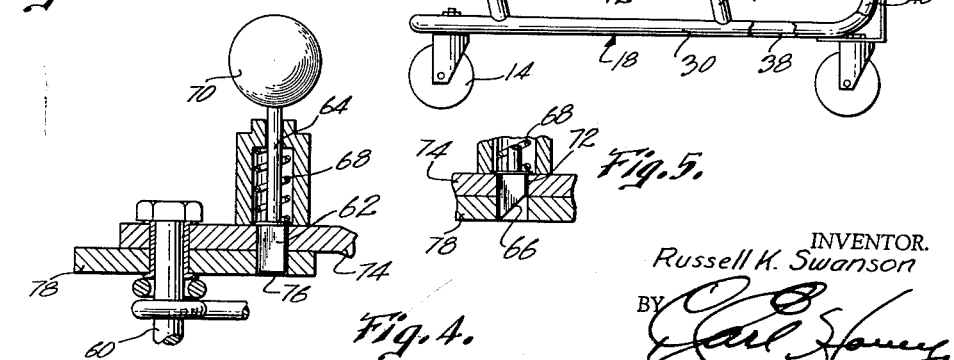
INVENTOR.
Russell K. Swanson
BY
ATTORNEY Sept. 4, 1962      R. K. SWANSON      3,052,319
CANTILEVER SHOPPING CART AND COUNTER ASSEMBLY
Filed May 4, 1959      2 Sheets-Sheet 2
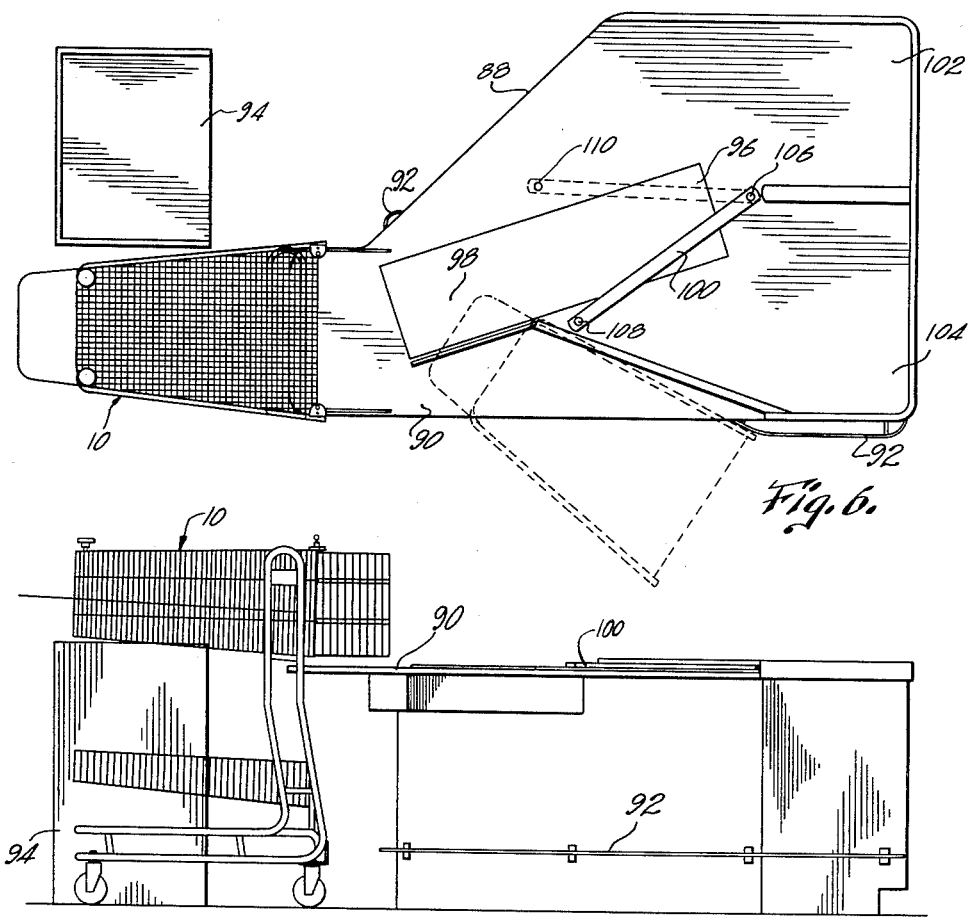
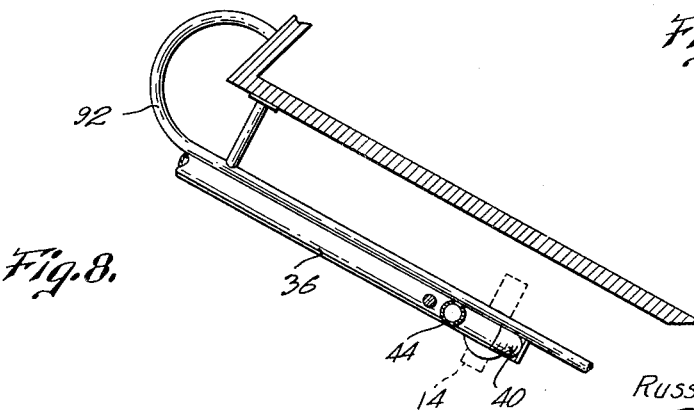
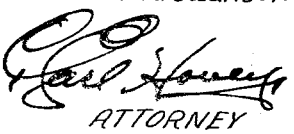
INVENTOR.
Russell K. Swanson
BY
ATTORNEY

_

3,052,319
CANTILEVER SHOPPING CART AND
COUNTER ASSEMBLY
Russell K. Swanson, 3212 Coleman Road,
Kansas City, Mo.
Filed May 4, 1959, Ser. No. 810,728
9 Claims. (Cl. 186—1)

This invention relates to a cantilever shopping cart and counter assembly wherein both the cart and the counter are made in a manner to facilitate the checking of merchandise by virtue of the fact that the same need not be lifted from the basket during checking, thereby affording a saving in time and labor on the part of the checker, as well as the customer.

It is the most important object of the present invention to provide a shopping cart that has a basket disposed in overhanging relationship to a primary mobile frame, to the end that the cart cooperates with a counter that is in turn provided with a lateral extension, all to the end that as the cart is moved along the checking station, the counter extension becomes interposed between the frame and the basket, permitting release of the merchandise from the basket onto the extension by simply opening certain gate means forming a part of the basket.

In the drawings:

FIG. 1 is a top plan view of a shopping cart made pursuant to the present invention.

FIG. 2 is a side elevational view thereof.

FIG. 3 is an enlarged, fragmentary plan view showing one of the lock means for one of the gates of the basket of the cart.

FIG. 4 is a fragmentary, cross-sectional view taken on line 4—4 of FIG. 3.

FIG. 5 is a fragmentary, detailed, cross-sectional view similar to FIG. 4 but looking in the opposite direction.

FIG. 6 is a plan view partially schematic illustrating the cart and the counter assembly, and the relationship therebetween during use.

FIG. 7 is an elevational view of the assembly shown in FIG. 6.

FIG. 8 is an enlarged, fragmentary view of a portion of the counter and a portion of the cart partially in section showing the guide rail of FIG. 7 in plan; and FIG. 9 is a fragmentary enlarged detailed cross-sectional view showing the spring means for one of the gates.

Shopping cart 10 as illustrated in the drawings, includes a frame 12 that is rendered mobile through the provision of a plurality of caster wheels 14. More specifically, the polygonal frame 12 includes a pair of relatively superimposed, U-shaped loops 16 and 18 joined together by a plurality of upright connectors 20.

A standard 22 extending upwardly from the frame 12 has a pair of legs 24 and 26 integral with legs 28 and 30 of loops 16 and 18 respectively, the legs 24 and 26 being interconnected by a cross member 32 and being integrally joined at the upper ends thereof by an arcuate bight portion 34. Horizontal legs 36 and 38 of loops 16 and 18 respectively, are integrally joined by an arcuate bight portion 40 at one end of the frame 12, such end of frame 12 being open. Legs 28 and 36 are joined integrally by a horizontal bight portion 42 at the opposite end of the frame 12, and a similar horizontal bight portion (not shown) immediately beneath the bight portion 42 integrally joins the legs 30 and 38 of the loop 18. Suitable framework 44 interconnecting leg 26 with leg 36 supports a lower basket 46 above the frame 12.

Upper basket 48 is supported in overlying relationship to the basket 46 solely by the standard 22, it being noted that the upper end of the standard 22 bears against one side of the basket 48 and is attached thereto by suitable clamp means 50.

Basket 48 is supported additionally by the standard 22 through the medium of a U-shaped arm 52 rigid to the legs 24 and 26 and extending laterally therefrom in overlying relationship to the frame 12. Basket 48 rests directly on the arm 52 and has attachment thereto by means of a clamp 54 that may be similar in nature to the clamp 50.

A pair of swingable gates 56 and 58 form one end of the basket 48, such gates being rendered swingable by virtue of the provision of vertical hinge pins 60. Gates 56 and 58 are held in the closed position shown by full lines in FIG. 1, through the medium of locking means each of which includes a bolt 62 mounted on a vertically reciprocable pin 64 and having an inclined lower face 66. A spring 68 yieldably holds the bolt 62 at the lower end of its path of travel and the same may be raised through the medium of a knob 70 on the upper end of pin 64.

Bolt 62 extends through an opening 72 in plate 74 and, when the gates 56 and 58 are closed, bolts 62 fit into openings 76 within plates 78 rigid to the basket 48. Thus, when the gates 56 and 58 are swung from the open position shown in FIGS. 1 and 2, extending outwardly, the bolt 62 slides along the plate 78 until it snaps into the opening 76. The bevelled ends 66 of the bolts 62 permit swinging of the gates 56 and 58 inwardly without necessity of actuating the knobs 70, since inward pressure on the gates 56 and 58 will cause the bolts 62 to rise out of the openings 76 against the action of springs 68.

Springs 80 for gates 56 and 58 are compressed when the gates 56 and 58 are swung inwardly and, therefore, when the gates are released such springs 80 will automatically swing the gates 56 and 58 to the closed position until such time as bolts 62 snap back into the openings 76. Springs 80 are sufficiently strong to swing the gates 56 and 58 open to the dotted line position illustrated in FIGS. 1 and 2 upon release of the locking means. Hence, a plurality of carts 10 may be stored in nested relationship since each basket 48 will receive an adjacent basket and each frame 12 will receive an adjacent frame. To this end also, the basket 46 is provided with a horizontally swingable gate 82, permitting the nesting of the baskets 46.

Cart 10 may be manipulated by virtue of the provision of a handle 84 on the basket 48, it being understood that the gates 56 and 58, as well as the gate 82, may well be placed at the opposite ends of the baskets 48 and 46 respectively, if desired, whereupon the handle 84 will extend in the opposite direction from the basket 48.

Still another manner of manipulating the cart 10 is shown in the drawings and includes swiveled knobs 86 secured to basket 48, and here again, if desired, four of such knobs 86 may be provided at each of the four corners of the basket 48 and be used in conjunction with handle 84 or in lieu thereof.

As shown in FIGS. 6 to 8 inclusive, the cart 10 is thus designed for use with a counter 88 of special construction. Counter 88 has an extension 90 that is elevated above the surface over which the cart 10 is rolled, and since the extension 90 is supported in a cantilever manner, it is unobstructed therebeneath. Its height is such that when the cart 10 is moved to the position shown in FIGS. 6–8, basket 48 overlies the extension 90 and the frame 12 moves therebeneath. It can be seen, therefore, that upon release of the locks for gates 56 and 58, the latter swing outwardly as shown in FIGS. 6 and 7, permitting discharge of merchandise from the basket 48 onto the extension 90 of counter 88.

When the cart 10 is moved along the counter extension 90, the standard 22 is held out of engagement with the extension 90 by virtue of a guide rail 92 therebeneath, the disposition of the horizontal guide rail 92 being such, as shown in FIG. 8, that the bight portion 40 of the frame 12 engages the rail 92. Therefore, as the frame 12 thus slides along rail 92, standard 22 moves along the extension 90 without engaging the same.

FIGS. 6 and 7 of the drawings also illustrate a cash register stand 94 behind which the checker may stand as he removes the merchandise from extension 90, checks the same and places the merchandise, item for item, upon an endless belt 96 forming a part of the counter 88 and traveling continuously in the direction of arrow 98. A deflector 100 causes the merchandise to move onto counter section 102 as the merchandise leaves the belt 96.

Thereupon, while the merchandise is being sacked by a workman from the counter section 102, the checker may serve the next succeeding customer after swinging the deflector 100 to the dotted-line position shown in FIG. 6. In such dotted-line position, deflector 100 causes the merchandise to move from the belt 96 onto counter section 104. Deflector 100 is secured to the counter 88 through the medium of a pivot pin 106, and when the deflector 100 is to be shifted, a pin 108 at the opposite end of deflector 100 is re-positioned in a hole 110 in counter 88.

Having thus described the invention what is claimed as new and desired to be secured by Letters Patent is:

1. A shopping cart comprising a polygonal basket; a polygonal frame; and a standard extending upwardly from the frame adjacent one corner of the latter, said standard being attached to one side of the basket adjacent one corner of the latter, the remaining sides of said basket being free of and spaced from said frame and said standard.

2. A shopping cart comprising a polygonal basket; a polygonal frame; a standard extending upwardly from the frame adjacent one corner of the latter, said standard being attached to one side of the basket adjacent one corner of the latter, the remaining sides of said basket being free of and spaced from said frame and said standard; and an arm extending laterally from the standard above the frame in supporting relationship to the basket therebeneath, said basket and said arm being substantially cantilevered from said standard.

3. The combination with a counter having an elongated, elevated extension of a shopping cart having a frame movable along a path beneath and longitudinally of said extension; a polygonal basket overlying the extension when the frame is beneath the extension; and a standard on the frame and secured to said basket at one side thereof, the remaining sides of said basket being free of and spaced from said standard and said frame, the standard being disposed alongside the extension when the latter is between the basket and the frame.

4. The combination with a counter having an elongated, elevated extension of a shopping cart having a frame movable along a path beneath and longitudinally of said extension; a polygonal basket overlying the extension when the frame is beneath the extension; a standard on the frame and secured to said basket at one side thereof; the remaining sides of said basket being free of and spaced from said standard and said frame, the standard being disposed alongside the extension when the latter is between the basket and the frame; and guide means beneath the extension and disposed for engagement by the frame as the cart is moved alongside the extension for preventing the standard from engaging the extension.

5. The combination with a counter having an elongated, elevated extension of a shopping cart having a frame movable along a path beneath and longitudinally of said extension; a basket having a pair of opposed sides and a pair of opposed ends, said basket overlying the extension when the frame is beneath the extension; and a standard on the frame and secured to said basket at one side thereof, the opposite side and opposed ends of said basket being free of and spaced from said standard and said frame, the standard being disposed alongside the extension when the latter is between the basket and the frame, said basket being provided with gate means thereon at one end thereof adapted to be opened when the basket is above the extension for release of merchandise from the basket onto the extension.

6. The combination as set forth in claim 5, and wherein is included releasable lock means on said gate means of said basket for releasably maintaining said gate means in a closed position, and wherein is included bias means on said gate means and said basket for yieldably holding said gate means against swinging movement toward and into said basket.

7. A shopping cart for use with a counter having an elongated, laterally projecting extension thereon, said cart comprising a mobile frame adapted for movement along a predetermined path of travel below said extension and provided with a pair of opposed sides; an elongated standard secured to and extending upwardly from one of the sides of said frame; and a basket secured to and extending laterally from said standard in overlying spaced relationship to said frame and forming with the latter and said standard a recess having an open side and opposed open ends, said basket adapted to overlie said extension when said frame moves along said path, whereby said extension is received within said recess and said basket may be advanced from one end of said extension to the opposite end thereof as said frame is moved along said path.

8. A shopping cart as set forth in claim 7 wherein said basket is provided with a pair of opposed ends, and wherein is included gate means on said basket at one of said ends thereof adapted to swing outwardly from the sides of said basket for permitting removal of merchandise from said basket, and lock means on said gate means for releasably maintaining the latter in a closed position.

9. A shopping cart as set forth in claim 8, wherein is included bias means on said gate means and said basket for yieldably holding said gate means against swinging movement toward said basket.

References Cited in the file of this patent

UNITED STATES PATENTS

| | | |
|---|---|---|
| 2,422,862 | Stottrup | June 24, 1947 |
| 2,496,399 | Lesser | Feb. 7, 1950 |
| 2,583,514 | Maslow | Jan. 22, 1952 |
| 2,596,749 | Webber | May 13, 1952 |
| 2,620,932 | Alpine | Dec. 9, 1952 |
| 2,628,142 | Dubach | Feb. 10, 1953 |
| 2,639,161 | Goldman | May 19, 1953 |
| 2,672,218 | Genung | Mar. 16, 1954 |